United States Patent
Nakashima et al.

(10) Patent No.: US 8,282,904 B2
(45) Date of Patent: Oct. 9, 2012

(54) CYLINDRICAL VESSEL MADE OF CARBON AND PROCESS FOR MAKING SILICON

(75) Inventors: Junichirou Nakashima, Shunan (JP); Satoru Wakamatsu, Shunan (JP); Manabu Sakita, Shunan (JP)

(73) Assignee: Tokuyama Corporation, Shunan-shi (JP)

(*) Notice: Subject to any disclaimer, the term of this patent is extended or adjusted under 35 U.S.C. 154(b) by 918 days.

(21) Appl. No.: 11/630,182

(22) PCT Filed: Jun. 22, 2005

(86) PCT No.: PCT/JP2005/011448
§ 371 (c)(1), (2), (4) Date: Dec. 20, 2006

(87) PCT Pub. No.: WO2005/123584
PCT Pub. Date: Dec. 29, 2005

(65) Prior Publication Data
US 2008/0025901 A1    Jan. 31, 2008

(30) Foreign Application Priority Data
Jun. 22, 2004    (JP) .................................. 2004-183702

(51) Int. Cl.
*C01B 33/00* (2006.01)
*C01B 33/02* (2006.01)
*C21B 3/00* (2006.01)
*B22D 41/05* (2006.01)

(52) U.S. Cl. .................... 423/445 R; 423/350; 266/275; 266/287

(58) Field of Classification Search .................. None
See application file for complete search history.

(56) References Cited

U.S. PATENT DOCUMENTS

| 3,682,686 | A | * | 8/1972 | Nakamura et al. | ............ 427/228 |
| 4,102,767 | A | | 7/1978 | Mazelsky et al. | |
| 4,343,772 | A | | 8/1982 | Levin et al. | |
| 5,045,398 | A | * | 9/1991 | Levin | ............ 428/446 |
| 5,476,679 | A | * | 12/1995 | Lewis et al. | ............ 427/122 |
| 6,784,079 | B2 | | 8/2004 | Wakamatsu et al. | |

FOREIGN PATENT DOCUMENTS

| JP | 7165467 A | 6/1995 |
| JP | 9157073 A | 6/1997 |
| JP | 2002029726 A | 1/2002 |
| JP | 2003020216 A | 1/2003 |
| WO | 02100777 A1 | 12/2002 |

OTHER PUBLICATIONS

Shigemitsu et al.; Electrical Properties of Glassy-Carbon Electrodes; Med. & Biol. Eng. & Comput.; 17, 465-470; 1979.*

* cited by examiner

*Primary Examiner* — Melvin C Mayes
*Assistant Examiner* — Guinever Gregorio
(74) *Attorney, Agent, or Firm* — The Webb Law Firm

(57) ABSTRACT

A cylindrical vessel made of carbon is used in the production of silicon. The inner surface of the vessel comes into contact with a silicon melt, wherein the permeation with silicon melt is reduced, formation of SiC is suppressed, and the vessel is resistant to deformation even when volumetric expansion ascribable to silicon is brought about. The carbon-made cylindrical vessel is made of a carbon material having a bulk specific gravity of 1.8 or more. The thermal expansion coefficient of the carbon material at 350 to 450° C. is preferably $3.5 \times 10^{-6}/°$ C. to $6.0 \times 10^{-6}/°$ C. A process for producing silicon uses said vessel wherein a chlorosilane is reacted with hydrogen.

7 Claims, 1 Drawing Sheet

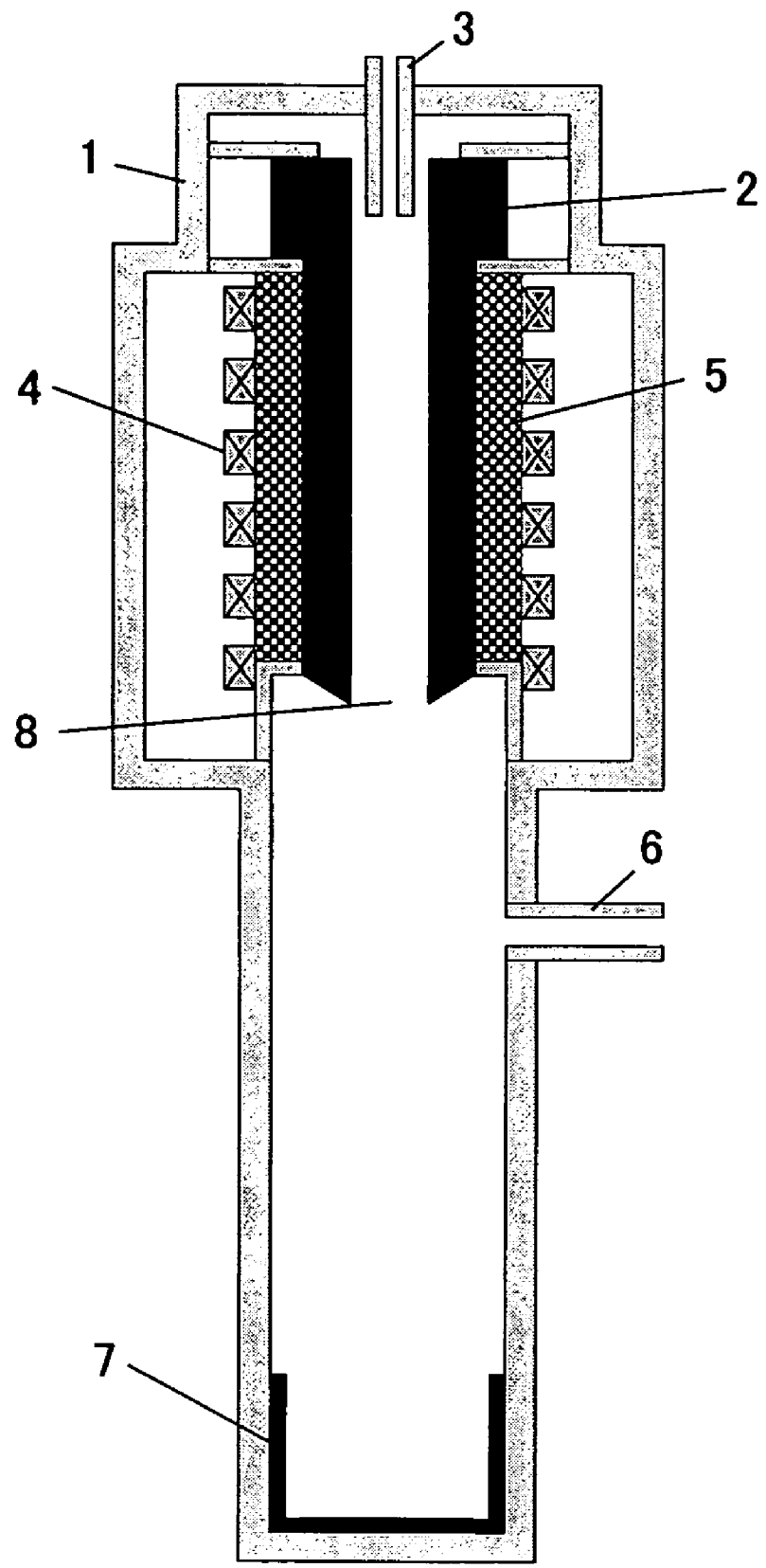

CYLINDRICAL VESSEL MADE OF CARBON AND PROCESS FOR MAKING SILICON

TECHNICAL FIELD

The present invention relates to a cylindrical vessel made of carbon and a production process of silicon using said vessel. More particularly, the present invention relates to a cylindrical vessel made of carbon that is suitably used in generating silicon by reaction of a chlorosilane with hydrogen and made of a carbon material that can resist contact with molten silicon, and a production process of silicon using said vessel.

BACKGROUND ART

Polycrystalline silicon is used as a raw material for semiconductors, solar cells and the like, which are presently utilized in various fields and expected to be further developed and demanded in future, and therefore high-purity polycrystalline silicon is desired to be produced effectively. As a conventional production process of polycrystalline silicon, there has been, for example, the Siemens process in which a surface of a silicon rod placed inside a bell jar is heated and brought into contact with a source gas for silicon deposition containing a chlorosilane, such as trichlorosilane ($SiHCl_3$; hereinafter referred to as TCS) and monosilane ($SiH_4$), and a reducing gas such as hydrogen to deposit polycrystalline silicon.

The Siemens process is characterized in that high-purity silicon is obtained and is currently employed as the most common process. However, the Siemens process has a problem in that it is required to carry out very troublesome procedures such as installation of a silicon rod used as a seed, electrical heating, deposition, cooling, taking-out, and cleaning of a bell jar since the deposition is performed in a batch mode.

To overcome such a problem, the present applicant proposed, as a process and an apparatus for effectively producing silicon, a production process of polycrystalline silicon in which a source gas for silicon deposition is fed to a cylindrical reaction vessel heated to a temperature not lower than the melting point of silicon to deposit silicon in a molten state, and the molten silicon thus deposited is continuously dropped from the lower end of the reaction vessel and collected; and a production apparatus used in said process (see Patent Document 1).

Further, the present applicant proposed a production process of polycrystalline silicon in which, to a cylindrical reaction vessel heated to a temperature below the melting point of silicon, a source gas for silicon deposition is fed to deposit silicon, and thereafter, by heating the inner surface of the cylindrical reaction vessel to a temperature not lower than the melting point of silicon, a part or the whole of the deposited silicon is melted to drop and collect the deposited silicon; and a production apparatus used in said process (see Patent Document 2).

In such silicon production apparatuses, a carbon material such as graphite is usually used as a material for a cylindrical reaction vessel in which silicon is deposited.

However, if a reaction vessel made of a carbon material is used in such production processes silicon as described above, when silicon melt comes into contact with the carbon material, the inside of the carbon material is permeated with silicon and SiC (silicon carbide) is formed through reaction of silicon with carbon. Such permeation with silicon melt and formation of SiC cause a stress to the inside of the carbon material due to volumetric expansion associated with formation of SiC, and thereby the carbon material is cracked. Thus, there has been a problem of reducing production efficiency.

To overcome such a problem, there has been proposed a method in which the surface of the reaction vessel is coated with an SiC coating film having a thickness of 10 to 500 μm by CVD method (see Patent Document 3). However, in such a method of applying SiC-coating on the surface of the reaction vessel, the effect of preventing permeation with silicon melt is not sufficient and still cracking of the reaction vessel and the like occur resulting in stopping operation. Thus, the production efficiency has not been sufficiently improved yet.

Patent Document 1: JP-A-2002-29726
Patent Document 2: WO 2002/100777
Patent Document 3: JP-A-1997(H09)-157073

An object of the present invention is to provide a cylindrical vessel made of carbon whose inner surface comes into contact with silicon melt, wherein permeation with silicon melt is reduced, formation of SiC is suppressed, and the vessel is resistant to deformation even when volumetric expansion ascribable to silicon is brought about; and a production process of silicon using said vessel.

As a result of earnest studies to solve the above problems, the present inventors have found that, by using a specific carbon material, permeation with silicon melt is reduced, formation of SiC is suppressed and the vessel is resistant to deformation even with volumetric expansion ascribable to silicon, and further it is possible to reduce the amounts of carbon and impurities contained in a carbon material incorporated into the desired product, silicon, and they have completed the present invention.

SUMMARY OF THE INVENTION

That is, the cylindrical vessel made of carbon relating to the present invention is used in an application where the inner surface of the vessel comes into contact with silicon melt and characterized by being made of a carbon material with a bulk specific gravity of 1.8 or more.

The thermal expansion coefficient of the carbon material at 350 to 450° C. is preferably in the range of $3.5\times10^{-6}$/° C. to $6.0\times10^{-6}$/° C. and more preferably in the range of $4.0\times10^{-6}$/° C. to $5.8\times10^{-6}$/° C.

The production process of silicon relating to the present invention is characterized in that, by using the carbon-made cylindrical vessel of the present invention as a reaction vessel, silicon is generated by reaction of a chlorosilane with hydrogen, a part or the whole of the resultant silicon is melted, and thereby the silicon is continuously or intermittently dropped and collected.

With the vessel made of carbon of the present invention, permeation of the inside of the carbon material with silicon melt and formation of SiC are reduced upon contact with silicon melt, and the vessel is resistant to deformation even if volumetric expansion is caused due to formation of SiC. Therefore, cracking of the vessel or other adverse phenomena can be significantly suppressed even if a smaller wall thickness is selected, and the service life of the vessel can also be much elongated.

Moreover, with the carbon material used for the cylindrical vessel made of carbon of the present invention, since the material degradation is suppressed to a small amount, it is possible to reduce the amounts of carbon and impurities contained in the carbon material incorporated into the desired product, that is, polycrystalline silicon.

Accordingly, polycrystalline silicon with higher purity can be efficiently produced by using the carbon-made cylindrical vessel of the present invention in a production process of silicon in which silicon is generated by reaction of a chlorosilane with hydrogen, a part or the whole of the resultant silicon is melted, and thereby the silicon is continuously or intermittently dropped and collected.

BRIEF DESCRIPTION OF DRAWINGS

FIG. 1 is a schematic view showing an example of configuration of a silicon production apparatus using the cylindrical vessel made of carbon (reaction vessel for generation of silicon) of the present invention.

BEST MODE FOR CARRYING OUT THE INVENTION

The cylindrical vessel made of carbon relating to the present invention and the production process of silicon using said vessel will be explained hereinafter.

The cylindrical vessel made of carbon relating to the present invention is a reaction vessel used in an application where the inner surface comes into contact with a silicon melt, the reaction vessel being made of a specific carbon material that can resist contact with the silicon melt. Such application where the inner surface comes into contact with the silicon melt includes, but not limited to, for example, a production process of silicon in which silicon is generated by reaction of a chlorosilane with hydrogen, a part or all of the resultant silicon is melted, and thereby the silicon is continuously or intermittently dropped and collected; and a process of generating trichlorosilane (TCS) by reaction of tetrachlorosilane (STC) with hydrogen.

In the reduction reaction of STC using hydrogen gas, TCS and HCl are mainly generated; however, silicon sometimes adheres to the reaction vessel as a byproduct. Conventionally, the reduction reaction of STC has been carried out with setting the reaction temperature low so as to prevent such adhesion of silicon. However, when the reaction temperature is decreased in the reduction of STC, the generation efficiency of TCS tends to decrease. On the other hand, increasing the reaction temperature in the reduction of STC causes problems such as cracking of the reaction vessel due to contact with silicon melt, as mentioned above. Therefore, the cylindrical vessel made of carbon of the present invention is also preferably used as a reaction vessel for such reduction of STC.

A carbon material used for the cylindrical vessel of the present invention has a bulk specific gravity (in accordance with JIS R 7222) of 1.8 or more, preferably 1.8 to 1.95, and particularly preferably 1.8 to 1.92. When the carbon material has such bulk specific gravity, it is possible to reduce permeation of the inside of the carbon material with silicon melt. Further, if stress is generated due to volumetric expansion ascribable to silicon, for example, volumetric expansion associated with solidification of the permeated silicon and volumetric expansion associated with formation of SiC, the reaction vessel is resistant to deformation and hence cracking or other failure of the reaction vessel can be prevented. If the bulk specific gravity is less than 1.8, voids are often connected continuously and degradation tends to proceed more quickly.

When a carbon material has a bulk specific gravity of 1.8 or more as described above, the carbon material has a bending strength (JIS R 7212) of 40 MPa or more and a reaction vessel excellent in strength can be obtained, thereby resulting in advantages, for example, the wall thickness can be reduced when a reaction vessel with a large dimension is used.

The carbon material is preferably isotropic carbon because it has less variation in quality and a material with a suitable specific gravity is readily obtained. There is no inconvenience if the bulk specific gravity of the carbon material exceeds 1.95.

By using a carbon material having a bulk specific gravity in the specific range described above, compared to the case using a commonly used carbon material (the bulk specific gravity is less than 1.8), there can be obtained a cylindrical vessel according to the present invention in which permeation with silicon melt is significantly reduced, formation of SiC due to reaction of the permeated silicon with carbon is suppressed, and the carbon material is less deformed even when the volumetric expansion ascribable to silicon occurs. Therefore, even in use where the reaction vessel is in contact with silicon melt, cracking or other failure of the reaction vessel can be prevented over a long period, thereby increasing the production efficiency.

Furthermore, the above-described carbon material generates only a small amount of disintegrated material upon contact with silicon melt, it is possible to reduce the amounts of carbon and impurities contained in the carbon material incorporated into the desired product, that is, polycrystalline silicon. Therefore, high-purity polycrystalline silicon can be produced by using the carbon-made cylindrical vessel of the present invention as a reaction vessel for generation of silicon.

The carbon material used for the cylindrical vessel of the present invention has preferably a thermal expansion coefficient at 350 to 450° C. of $3.5 \times 10^{-6}/°$ C. to $6.0 \times 10^{-6}/°$ C. and particularly preferably of $4.0 \times 10^{-6}/°$ C. to $5.8 \times 10^{-6}/°$ C. When the carbon material having a bulk specific gravity within the specific range described above has such a thermal expansion coefficient, it is possible to further reduce permeation of the inside of the carbon material with silicon melt, which enhances the above-mentioned effect of preventing of cracking or other failure of the reaction vessel due to volumetric expansion ascribable to silicon.

The cylindrical vessel made of carbon of the present invention can be suitably used as a reaction vessel for generation of silicon in a production process of silicon in which silicon is generated by reaction of a chlorosilane with hydrogen, a part or the whole of the resultant silicon is melted, and thereby the silicon is continuously or intermittently dropped and collected. FIG. 1 shows an example of basic configuration (schematic view) of a silicon production apparatus used in such a production process of silicon.

As shown in FIG. 1, the basic configuration of the silicon production apparatus comprises, for example, in a metallic closed chamber 1, a cylindrical vessel made of carbon (reaction vessel for generation of silicon) 2 of the present invention, a source gas feed pipe 3 for feeding a chlorosilane and hydrogen gas into the vessel 2, a heating means 4 for heating the inner surface of the vessel 2 to a temperature not lower than the melting point of silicon, a heat insulator 5 installed between the heating means 4 and the vessel 2, a gas discharge pipe 6 for discharging a reaction exhaust gas and a silicon collecting container 7 for collecting silicon dropped from the vessel 2 by melting a part or the whole of the deposited silicon. In addition, in the space generated by the outer wall of the vessel 2 and the inside wall of the closed chamber 1, a seal gas feed pipe (not shown) may be provided to feed a seal gas such as nitrogen, hydrogen, argon and the like.

For the reaction vessel 2 for producing silicon used in such a silicon production apparatus as described above, the essential structure, at least, is a cylindrical vessel and has, at the lower end, an opening portion 8 from which silicon deposited and melted inside the vessel can spontaneously flow down to drop. Namely, there are no particular limitations on the crosssectional shape of the reaction vessel 2, the shape of the opening portion 8 and the like if the production efficiency of silicon is not reduced. Further, the top of the reaction vessel 2 may be flange shape as shown in FIG. 1.

The source material feed pipe 3 is provided to directly feed a source gas containing a chlorosilane and hydrogen into the space surrounded by the inner wall of the reaction vessel 2. The chlorosilane used as the source gas includes various publicly known chlorosilanes, specifically monosilane, dichlorosilane (DCS), trichlorosilane (TCS), silicon tetrachloride (STC) and the like. Among them, monosilane and TCS are preferred because high-purity materials are industrially available in large quantities.

The heating means 4 is not particularly limited if it can heat the inner wall of the reaction vessel 2 to a temperature not lower than the melting point of silicon (approximately 1410 to 1430° C.). A high-frequency coil is preferably used in terms of energy efficiency.

The gas discharge pipe 6 is provided to discharge a reaction exhaust gas out of the system. Analytical equipment such as a gas chromatograph may be connected to the gas discharge pipe 6 to measure the gas composition of the reaction exhaust gas. By calculating a mass balance from the gas composition of the reaction exhaust gas measured in this way, more detail can be known on the state of the deposition reaction, the reaction efficiency and the like. Through adjusting the reaction temperature, the gas feed amount and other conditions based on the analytical results, the production efficiency of polycrystalline silicon can be improved. Further, abnormalities can be detected at an early stage, thereby preventing major trouble in advance.

The silicon collecting container 7 is a vessel that receives and cools molten silicon or partially molten solid silicon dropped from the reaction vessel 2. Such silicon collecting container is not particularly limited if it causes no trouble in the collecting operation and the like, and a conventionally used collecting container may be used.

With using a silicon production apparatus equipped with the cylindrical vessel made of carbon of the present invention as a reaction vessel for generation of silicon, it is possible to overcome the previous problem that the reaction vessel is cracked due to contact with silicon melt, as well as to significantly reduce the amounts of impurities derived from the material, such as carbon, incorporated into the obtained silicon, and therefore high-purity polycrystalline silicon can be produced efficiently. Moreover, some improvement measures that have been implemented in conventional silicon production apparatuses may be applied to the silicon production apparatus as appropriate within a range where the objects of the present invention are not impaired.

With a cylindrical vessel made of a carbon material having a bulk specific gravity and a thermal expansion coefficient within the specific ranges described above used as a reaction vessel for the generation of silicon, more significant effect can be attained on the prevention of cracking of the reaction vessel due to contact with silicon melt, so that a smaller wall thickness can be selected for the reaction vessel. If the wall thickness of the reaction vessel is reduced in this way, the inner surface of the reaction vessel can be heated to the desired temperature with less energy. Therefore, a smaller wall thickness of the reaction vessel is more advantageous in terms of energy efficiency, resulting in a merit of reducing the production cost of polycrystalline silicon.

EXAMPLES

Hereinafter, the present invention will be explained more specifically based on Examples, but the present invention is not limited to these Examples.

Example 1

On a reaction apparatus as shown in FIG. 1 was mounted a reaction vessel for generation of silicon (inside diameter: 45 mm, wall thickness: 15 mm, entire length: 1000 mm) made of a carbon material (thermal expansion coefficient: $4.8 \times 10^{-6}/°C.$) having a bulk specific gravity of 1.82. A mixed gas containing 10 kg/H of trichlorosilane and 40 Nm$^3$/H of hydrogen was passed into the reaction vessel, and the reaction vessel was heated to a temperature of 1450° C. or higher by high-frequency heating to deposit polycrystalline silicon for 100 hr. After completion of the reaction, the reaction vessel was removed from the reaction apparatus and the state of the reaction vessel (the presence of cracking of the reaction vessel and the depth of the inside of the reaction vessel permeated with silicon) was observed. The results are shown in Table 1.

Silicon deposition reaction was performed in the same manner as described above except for use of a reaction vessel for generation of silicon (inside diameter: 45 mm, wall thickness: 10 mm, entire length: 1000 mm) made of a carbon material (thermal expansion coefficient: $4.8 \times 10^{-6}/°C.$) having a bulk specific gravity of 1.82 or a reaction vessel (inside diameter: 45 mm, wall thickness: 5 mm, entire length: 1000 mm) made of the same material, and the state of the reaction vessel was observed. The results are shown in Table 1.

Examples 2 to 4

Silicon deposition reaction was performed in the same manner as Example 1 except for use of a reaction vessel for generation of silicon made of a carbon material having the bulk specific density and the thermal expansion coefficient shown in Table 1, and the state of the reaction vessel after completion of the reaction was observed. The results are shown in Table 1.

Comparative Examples 1 to 2

Silicon deposition reaction was performed in the same manner as Example 1, except for use of a reaction vessel for generation of silicon made of a carbon material having the bulk specific density and the thermal expansion coefficient shown in Table 1, and the state of the reaction vessel after completion of the reaction was observed. The results are shown in Table 1.

TABLE 1

|  | Bulk specific gravity | Thermal expansion coefficient ($10^{-6}/°C.$) | Cracking of reaction vessel | | | Permeation depth of silicon (mm) |
|---|---|---|---|---|---|---|
|  |  |  | Wall thickness 15 mm | Wall thickness 10 mm | Wall thickness 5 mm |  |
| Ex. 1 | 1.82 | 4.8 | Not observed | Not observed | Not observed | 0.1 |
| Ex. 2 | 1.85 | 5.4 | Not observed | Not observed | Not observed | 1 |
| Ex. 3 | 1.82 | 5.9 | Not observed | Not observed | Observed | 1.5 |

TABLE 1-continued

|  | Bulk specific gravity | Thermal expansion coefficient ($10^{-6}/°C$) | Cracking of reaction vessel | | | Permeation depth of silicon (mm) |
|---|---|---|---|---|---|---|
|  |  |  | Wall thickness 15 mm | Wall thickness 10 mm | Wall thickness 5 mm |  |
| Ex. 4 | 1.82 | 7.1 | Not observed | Observed | Observed | 1.5 |
| Comp. Ex. 1 | 1.77 | 4.5 | Observed | Observed | Observed | 1 |
| Comp. Ex. 2 | 1.62 | 3.5 | Observed | Observed | Observed | 5 |

As shown in Table 1, when the reaction vessels for generation of silicon of the present invention (Examples 1 to 4) were used, no cracking was observed in the reaction vessel (wall thickness: 15 mm) because the inside of the carbon material was not deeply permeated with silicon melt even after the deposition reaction was continuously carried out for a long time. Further, with using the reaction vessels made of a carbon material having a high bulk specific gravity and a low thermal expansion coefficient (Examples 1 and 2), even when the wall thickness of the reaction vessel was reduced, no cracking was observed in the reaction vessel (wall thickness: 5 mm). Here, the permeation depth of silicon is an average value of the data measured in arbitrary five positions.

The invention claimed is:

1. A cylindrical vessel consisting essentially of a carbon material and having an inner surface for contacting a silicon melt, the carbon material having a bulk specific gravity of 1.8 to 1.95, wherein the inner surface of the cylindrical vessel consists essentially of the carbon material, wherein the carbon material suppresses the formation of silicon carbide,
   wherein said cylindrical vessel is a reaction vessel for generation of silicon used in a process in which silicon is generated by reaction of a chlorosilane with hydrogen, a part or all of the generated silicon is melted, and thereby the silicon is continuously or intermittently dropped and collected.

2. The cylindrical vessel according to claim 1, wherein the thermal expansion coefficient of the carbon material at 350 to 450° C. is in the range of $3.5 \times 10^{-6}/°C$ to $6.0 \times 10^{-6}/°C$.

3. The cylindrical vessel according to claim 1, wherein the thermal expansion coefficient of the carbon material at 350 to 450° C. is in the range of $4.0 \times 10^{-6}/°C$ to $5.8 \times 10^{-6}/°C$.

4. The cylindrical vessel according to claim 1, wherein the cylindrical vessel consists of a carbon material.

5. A production process of silicon comprising the steps of providing a cylindrical vessel made of a carbon material having a bulk specific gravity of 1.8 to 1.95, defining a reaction vessel, wherein the carbon material suppresses the formation of silicon carbide, wherein silicon is generated by reacting a chlorosilane with hydrogen, a part or all of the generated silicon is melted, and thereby the silicon is continuously or intermittently dropped and collected.

6. The production process of silicon according to claim 5, wherein the thermal expansion coefficient of the carbon material at 350 to 450° C. is in the range of $3.5 \times 10^{-6}/°C$ to $6.0 \times 10^{-6}/°C$.

7. The production process of silicon according to claim 5, wherein the thermal expansion coefficient of the carbon material at 350 to 450° C. is in the range of $4.0 \times 10^{-6}/°C$ to $5.8 \times 10^{-6}/°C$.

* * * * *